H. W. BROOKS & S. F. KRUPP.
RESILIENT WHEEL.
APPLICATION FILED APR. 21, 1911.
1,016,871.
Patented Feb. 6, 1912.
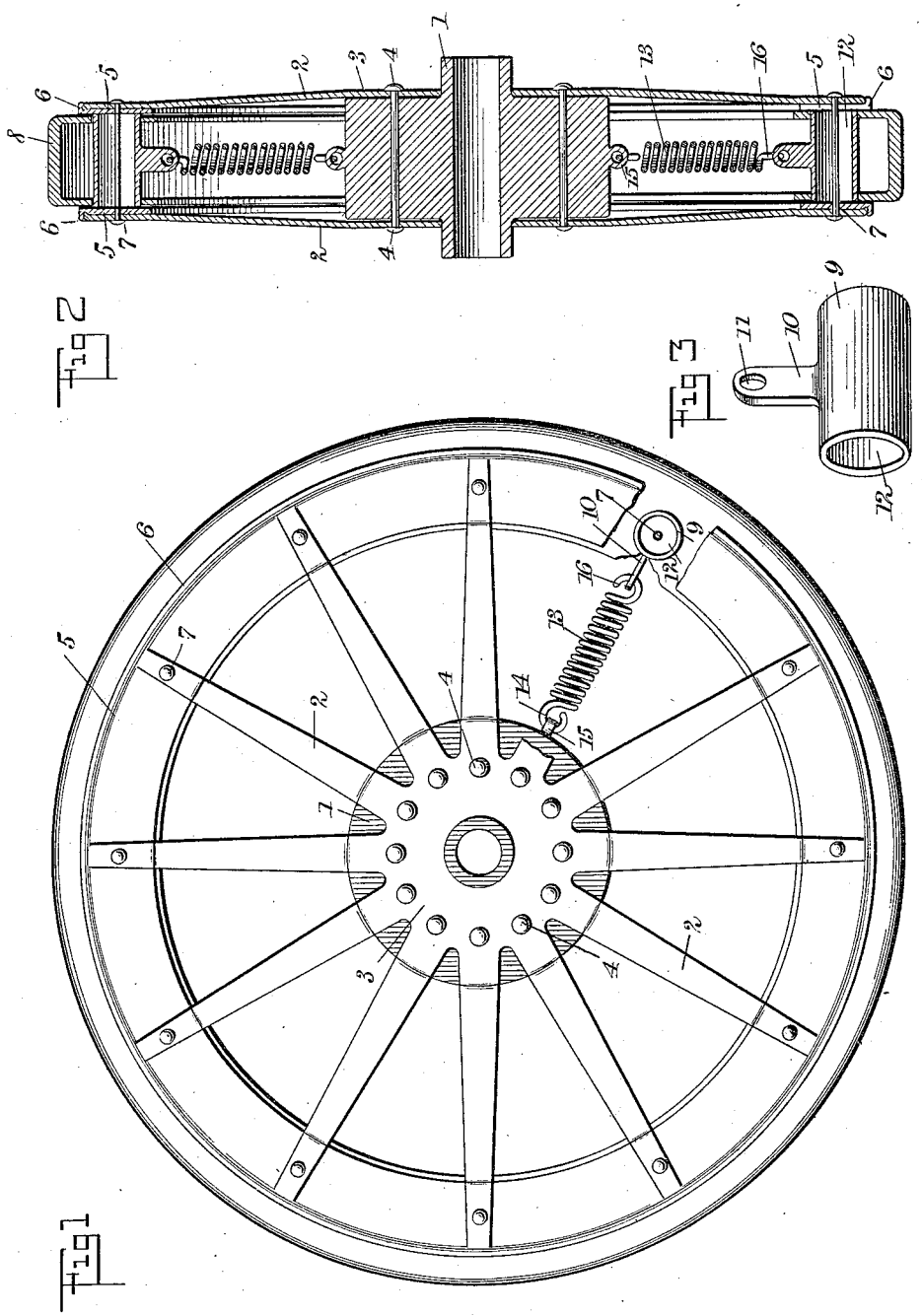
WITNESSES
C J Hachenberg
L. J. Gallagher
INVENTORS
Howard W. Brooks
Smith F. Krupp
BY
Munn & Co
ATTORNEYS

UNITED STATES PATENT OFFICE.

HOWARD WILBUR BROOKS AND SMITH FREDERICK KRUPP, OF MEMPHIS, TENNESSEE.

RESILIENT WHEEL.

1,016,871. Specification of Letters Patent. Patented Feb. 6, 1912.

Application filed April 21, 1911. Serial No. 622,470.

*To all whom it may concern:*

Be it known that we, HOWARD W. BROOKS and SMITH F. KRUPP, citizens of the United States, and residents of Memphis, in the county of Shelby and State of Tennessee, have invented a new and Improved Resilient Wheel, of which the following is a full, clear, and exact description.

Our invention relates generally to resilient wheels and more particularly it involves a construction wherein the hub and spokes form a rigid structure, the tire of the wheel being resiliently engaged with the hub whereby flexibility of the tire when the wheel is in use is obtained.

The object of our invention is to provide an improved wheel in which the hub and the spokes, together with a rim form an integral structure, the tire being resiliently positioned between opposite sides of the wheel whereby the tire may move relatively to the rest of the device as it is drawn over a roadway.

Reference is to be had to the accompanying drawings forming a part of this specification, in which like characters of reference denote corresponding parts in all the views, and in which—

Figure 1 is a side view of our improved wheel, one of the spokes being removed in order to show the spring construction; Fig. 2 is a vertical sectional view thereof; Fig. 3 is a perspective of one of the thimbles carried by the inner portion of the tire.

The wheel is made up of a hub 1 having a plurality of spokes 2, preferably of metal, extending radially therefrom and on opposite sides thereof, these spokes being preferably extended from a central portion 3 whereby an integral structure is secured, this structure being maintained in position on the hub by means of suitable bolts 4. Adjacent the outer ends of the spokes are two rims 5, each rim being provided along its outer periphery with a shoulder 6 which abuts the ends of the spokes, the spokes being secured to each of the rims by suitable bolts 7.

The structure of our wheel thus far described is designed as a rigid structure, the resiliency being obtained in the manner to be now set forth.

The tire 8 is of U-shaped construction, the member connecting the opposite sides thereof forming a tread portion, each of the opposite sides being provided with a number of alining openings, each pair of openings being adapted to receive a suitable thimble 9 having a boss 10 projecting therefrom, there being a suitable opening 11 at the outer end of the boss. From Fig. 2 it will be noted that these thimbles are so positioned around the tire that each of the bolts 7 which extends through the opposite spokes and the rims also extends through the open portion 12 of the thimble. The tire with the thimbles secured in the openings therein lie between the opposite rim portions of the wheel, and a plurality of helical springs 13 maintain the tire in position, one end 14 of each of the springs being secured to a suitable eye 15 carried by the hub 1, the other end 16 of each of the springs being positioned within the opening 11 in the boss 10 carried by each of the thimbles 9; the number of springs is preferably equal to the number of pairs of spokes, one of the springs being positioned between each pair of spokes.

In Fig. 2 it will be observed that the diameter of the opening 12 in the thimble 9 is much greater than the bolt 7 which extends through this opening whereby, as the wheel is drawn over the ground, the rim 8 is permitted a desirable amount of play toward and from the center of the wheel as various obstructions in the road are passed; the tire, being secured resiliently by means of the springs 13, will change its position with respect to the center of the hub as the wheel continues over the ground, these springs, however, always tending to keep the tire concentric with the hub.

By reason of the fact that the spokes and rims of the wheel are rigid, the resiliency being a feature of the tire, the wheel is adapted to a variety of uses by reason of its strength and rigidity and is equally adapted for automobiles or vehicles of any kind, including bicycles.

While we have shown a certain relation between the sizes and shape of the parts, it is obvious that many changes may be made in these features without departing from the spirit and scope of the invention, as defined in the appended claims.

Having thus described our invention, we claim as new, and desire to secure by Letters Patent:—

1. A resilient wheel comprising a hub, a plurality of spokes radiating therefrom and on opposite sides thereof, rims secured to the outer ends of the said spokes, bolts extending from the spokes on one side of the wheel to the spokes on the other side of the wheel whereby the rim is positioned thereon, a U-shaped tire positioned between the said rims, a plurality of alining openings in each side of the tire, a plurality of thimbles carried by the said tire, each thimble being positioned by engagement in one pair of said alining openings, the said bolts connecting the said spokes and rims extending through the said thimbles and being normally out of engagement therewith, together with a number of springs each in engagement at one end with the hub and at the other end with the said thimbles whereby the said tire is resiliently mounted with respect to the hub.

2. A resilient wheel comprising a hub, a plurality of spokes radiating therefrom and on opposite sides thereof, the outer ends of the said spokes on each side of the said hub being connected to a rim, a U-shaped tire positioned between the said rims, a plurality of thimbles carried by the said tire, bolts extending through the said thimbles and in engagement at opposite ends with opposite spokes, each of the said thimbles being provided with a boss having an opening therein and each of the openings in the said bosses being in engagement with a helical spring, the other end of the said spring being in engagement with the said hub whereby the said tire is resiliently positioned between the said rims.

In testimony whereof we have signed our names to this specification in the presence of two subscribing witnesses.

HOWARD WILBUR BROOKS.
SMITH FREDERICK KRUPP.

Witnesses:
N. B. BLACK,
G. B. HENRY.

Copies of this patent may be obtained for five cents each, by addressing the "Commissioner of Patents. Washington, D. C."